June 10, 1958   E. J. HUNTER ET AL   2,838,269
DIAPHRAGM VALVE WITH SELF PURGING BLEED PORT
Filed Aug. 21, 1953
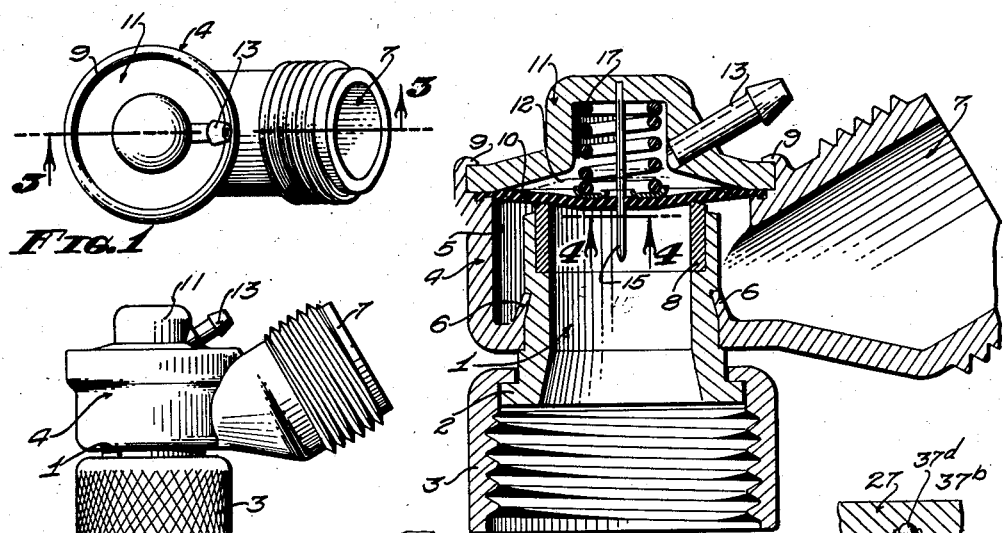
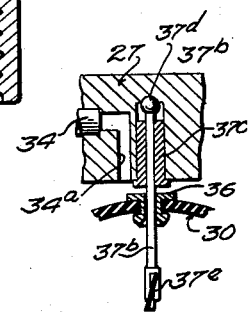
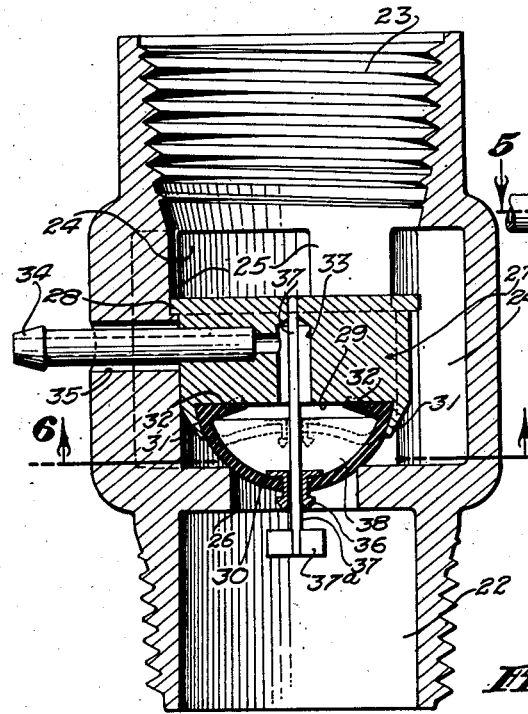
EDWIN J. HUNTER
LORENZO A. RICHARDS
INVENTORS
BY Lloyd Spencer
ATTORNEY

2,838,269
DIAPHRAGM VALVE WITH SELF PURGING BLEED PORT

Edwin J. Hunter and Lorenzo A. Richards, Riverside, Calif.

Application August 21, 1953, Serial No. 375,775

1 Claim. (Cl. 251—61)

Our invention relates to diaphragm valve with self purging bleed port, and included in the objects of our invention are:

First, to provide a valve of the type which employs a diaphragm and pressure chamber in communication with the pressure side of the valve through a restricted bleed port so arranged as to be self-purging, thereby to minimize the possibility of clogging and permit satisfactory functioning of the valve even when controlling flow of water or other fluid which may contain suspended solid matter.

Second, to provide a valve wherein the bleed port is incorporated in the diaphragm and is restricted by a fixed stem so that when the diaphragm moves as the valve is opened or closed, the stem wipes along the margins of the bleed port.

Third, to provide a valve which is particularly adapted for use in connection with automatic irrigation systems such as shown in the application of Lorenzo A. Richards, Method and Apparatus for Irrigating Plants, Serial No. 34,946, filed June 24, 1948, issued April 6, 1954, as Patent No. 2,674,490, wherein flow of water in a pilot line causes the booster valve to open.

Fourth, to provide a valve which is particularly simple and inexpensive of construction and which lends itself to manufacture in small capacity sizes: for example, to control as small as a three-eighths inch line; but which, however, functions equally well in large capacity sizes.

Fifth, to provide a valve, one form of which is so arranged that the pressure chamber diaphragm also constitutes the member which controls the main flow passage of the booster valve, the diaphragm being formed of rubber or similar material and perforated to receive a fixed stem which is grooved to define a bleed port through the diaphragm.

With the above and other objects in view, as may appear hereinafter, reference is directed to the accompanying drawings, in which:

Figure 1 is a top view of one form of the booster valve adapted to be interposed between a hose faucet and a hose.

Figure 2 is a side view thereof.

Figure 3 is an enlarged sectional view thereof through 3—3 of Fig. 1, showing by solid lines the valve in its closed position and by broken lines in its open position.

Figure 4 is an exaggerated sectional view taken from the line 4—4 of Fig. 3 and showing the means forming the self-purging bleed port.

Figure 5 is an enlarged longitudinal sectional view of a modified form of the booster valve arranged for axial flow, the view being taken through 5—5 of Fig. 6.

Figure 5A is a fragmentary sectional view in the same plane as Fig. 5 showing a modified post with the valve in open position.

Figure 6 is an enlarged transverse sectional view therethrough taken through 6—6 of Fig. 5.

Reference is first directed to Figs. 1 through 4. The valve here shown is adapted to be interposed between a hose faucet and a hose, although the inlet and outlet ends may be arranged to suit any desired type of installation. The booster valve includes a tubular stem 1 having a flange 2 and one end to journal an internally threaded hose fitting 3 adapted to fit a hose faucet.

A valve body 4 is provided which includes a cylindrical cup-shaped valve cavity 5. The bottom of the valve body is apertured to receive the stem 1. The margins of the aperture are provided with an axially extending lip 6 which is capable of being constricted to fit into a mating groove in the stem so as to secure the stem and valve body 4 together and to dispose the upper end of the stem upright in the valve cavity 5. The valve cavity 5 is intersected by a laterally directed outlet port 7 in the form of an externally screwthreaded nipple adapted for connection to a hose.

The extremity of the stem 1 within the valve cavity 5 receives a seat element 8. A shoulder and a sealing lip 9 are provided at the upper end of the cavity 5. The sealing lip clamps and seals on the shoulder a diaphragm 10 of rubber or rubber-like material and a cap 11. The cap 11 and diaphragm 10 define a pressure chamber 12 of larger area than the bore through the stem 1 and seat element 8. The pressure chamber is provided with a control line outlet 13 adapted for connection to a pilot valve (not shown) so that liquid may be drained from the pressure chamber to relieve pressure therein.

The diaphragm 10 is provided with an inlet bleed port 14, Fig. 4, through which protrudes a metering pin 15. The metering pin 15 is fixed in the cap 11 and is provided with an axially extending metering groove 16. A spring 17 normally holds the diaphragm 10 against its seat 8 to close the valve.

Operation of the booster valve shown in Figs. 1 through 4 is as follows:

When flow from the pressure chamber 12 is shut off, fluid is admitted through the inlet bleed port 14 formed by the groove 16 in the pin 15. As the pressure on opposite sides of the diaphragm is equalized the diaphragm moves to the closed position shown by solid lines and is held there by line pressure, inasmuch as the area of the pressure chamber exceeds the area of the port 8. Upon opening the control line outlet 13, which is of larger capacity than the inlet bleed port, the pressure in the pressure chamber drops, permitting the diaphragm 10 to open.

Should the inlet bleed port become clogged, the booster valve would fail to shut off. This is a troublesome problem with booster valves. The arrangement of the fixed pin and the bleed port located in the diaphragm itself so that during movement of the diaphragm the bleed port wipes along the stem, tends to purge or clean the bleed port. Also under flow conditions there is a tendency of the diaphragm valve to flutter or agitate slightly in the region of the bleed port, which together with the resilient nature of the material comprising the diaphragm does much to keep the bleed port free, even under adverse conditions wherein the water flowing through the valve may contain suspended solid matter.

The construction shown in Figs. 1 through 4 is particularly adapted for use in conjunction with an automatic irrigation system wherein a moisture sensitive means determines flow in a small control line of, for example, one-eighth inch tubing; flow occurring in the control line when the soil demands moisture and ceasing when the soil is adequately wetted. Thus, the booster valve as shown in Figs. 1 through 4 is interposed between a hose faucet and a hose provided with one or several sprinklers supplying the area serviced by the moisture sensitive means.

Reference is now directed to Figs. 5 and 6. The construction here shown is also particularly arranged for use in conjunction with a moisture sensitive means and control line; in this case the booster valve being particularly suited for the operation of sprinklers wherein the valve may be interposed in the stand pipe connected to the sprinkler or any supply line thereto.

In this construction the booster valve includes a valve body 21 having a coaxially disposed inlet 22 and outlet 23, either or both of which may be internally or externally screw-threaded to form a coupling, nipple or adapter fitting. Between the inlet and outlet the valve body is enlarged to form a valve chamber 24 with internal longitudinal ribs 25 so as to define therebetween longitudinally extending water courses. The inlet end of the valve chamber 24 is constricted to provide an inlet port 26.

Press fitted between the ribs 25 or otherwise sealingly secured within the valve chamber 24 is a plug member 27, provided with a position determining flange 28 which seats on a shoulder formed by counterboring the upper portions of the ribs 25. The plug member is provided with a socket 29 which faces the inlet port 26.

Fitted within the socket 29 is a combination diaphragm and valve element 30 formed of rubber or rubber-like material. The valve element 30 comprises a hemispherical hollow protruding portion adapted to engage the inlet valve seat or port 26. The maximum diameter of the valve element is greater than the port 26. The valve element is secured in place by an inturned lip 31 forming the margins of the socket 29. In addition, the inner or base end of the valve element 30 is provided with an inturned flange 32 which seats against the base of the socket 29 and is held there by water pressure within the valve member. The socket 29 is provided with a coaxial recess 33 intersected by a lateral opening which receives a press fitted or otherwise secured control line outlet tube 34 which projects through an accommodation opening 35 in one of the ribs 25.

A metering pin with a longitudinal groove such as the pin 15 of the first described structure may extend through an opening formed in the valve element 30 itself. Alternately, the valve element 30 may be provided with a bushing 36 formed of metal or tough plastic material such as nylon. The bushing is bored to receive loosely a metering pin 37 secured in the plug 27. The exposed extremity of the metering pin may have a vane 37a tending to vibrate the pin when the valve is open and keep the bleed port open.

The hemispherical interior of the valve element 30 forms a pressure chamber 38 of larger area than the inlet port 26.

Operation of the booster valve shown in Figs. 5 and 6 is essentially the same as in the first described construction. Presence of line pressure in the upper chamber 38 maintains the valve element 30 closed. Relief of this pressure permits the valve to open. Pressure fluid is supplied through the bleed port defined between the pin 37 and the bushing 36. Movement of the valve element along the pin 37 and vibration of the pin tends to clean and purge any clogging material from the inlet bleed port.

Reference is directed to Fig. 5A. Here shown is a modified arrangement in which a rotatable pin 37b is mounted in a bushing 37c set in a recess in the plug 27. The inner end of the pin 37b is enlarged to form a rudimentary thrust bearing 37d whereas the outer end is provided with a rudimentary impeller 37e to cause rotation when the valve is open and maintain the bleed port open. A separate passage 34a communicates with the outlet tube 34.

We claim:

A valve comprising: a tubular stem forming an inlet port at one end, a flange at its other end, and an external channel intermediate its ends; an inlet fitting journalled on said flanged end; a valve body having a tubular portion surrounding and spaced from the inlet end of said stem, an internal flange at one end of said tubular portion fitting said annular channel to secure said body thereon, and an outlet port extending laterally from said tubular portion; a cap overlying said inlet port and closing said tubular portion, said cap having a bleed outlet; a diaphragm secured by its margins between said cap and tubular portion and movable to and from engagement with said inlet port; said diaphragm forming with said cap a pressure chamber of larger effective area than said inlet port; said diaphragm deflecting fluid flow from said inlet port to said outlet port and thereby caused by the flow of fluid to vibrate; said valve membrane having a bleed port therein for passage of fluid from said inlet port into said pressure chamber; and a wiper pin anchored at one end and extending through said bleed port to restrict the effective area thereof; said membrane, on vibrating in response to turbulent flow through said tubular stem and valve body, effecting a scrubbing action on said pin thereby to maintain said wiper pin free of accumulations and maintain said bleed port open.

References Cited in the file of this patent

UNITED STATES PATENTS

| | | |
|---|---|---|
| 171,514 | Hyde | Dec. 28, 1875 |
| 509,401 | Scott | Nov. 28, 1893 |
| 848,739 | Gut | Apr. 2, 1907 |
| 1,046,236 | Wagner | Dec. 3, 1912 |
| 1,165,913 | Shanks | Dec. 28, 1915 |
| 1,501,331 | Gulick | July 15, 1924 |
| 1,540,214 | Hudson | June 2, 1925 |
| 1,808,989 | Langdon | June 9, 1931 |
| 1,851,062 | Protzer | Mar. 29, 1932 |
| 1,877,780 | Ackerman | Sept. 20, 1932 |
| 2,208,122 | Dickson | July 16, 1940 |
| 2,648,351 | Curtis | Aug. 11, 1953 |

FOREIGN PATENTS

| | | |
|---|---|---|
| 492,672 | Germany | Feb. 26, 1930 |